Sept. 21, 1965        P. BECKMAN        3,207,629
FLUID LEVEL AND TEMPERATURE SENSOR
Filed Oct. 8, 1962
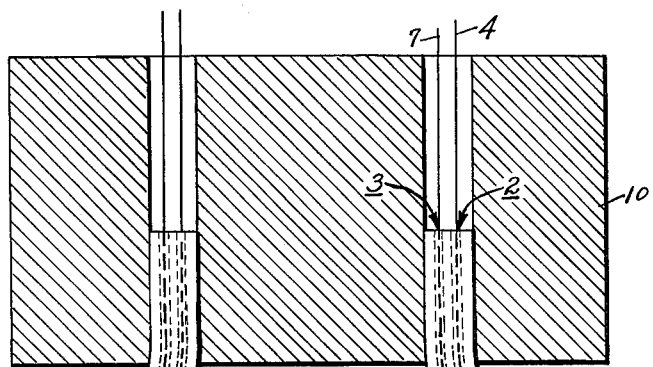
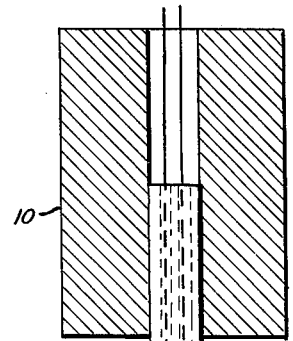
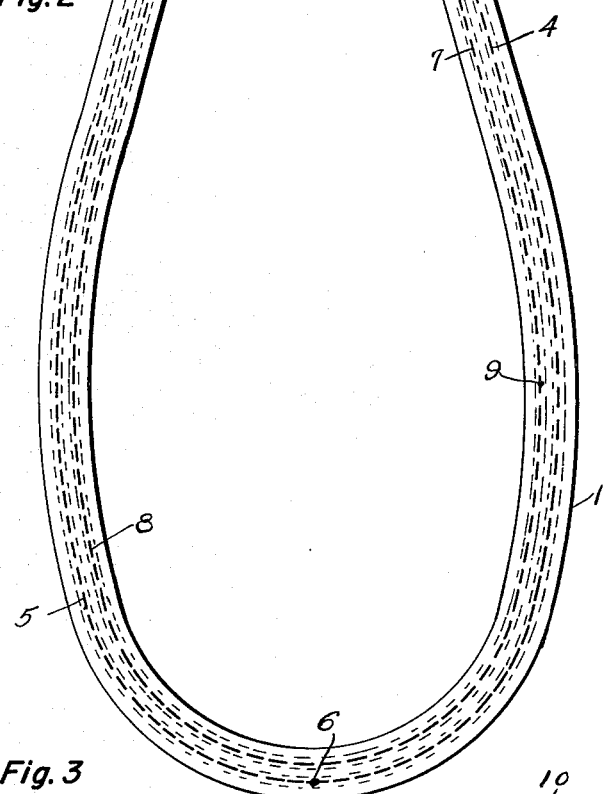
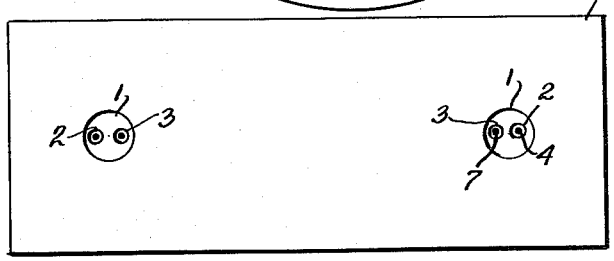
INVENTOR
Paul Beckman
By *Edward W. Hathaway*
Attorney

United States Patent Office 3,207,629
Patented Sept. 21, 1965

3,207,629
FLUID LEVEL AND TEMPERATURE SENSOR
Paul Beckman, 944 Henrietta Ave.,
Huntington Valley, Pa.
Filed Oct. 8, 1962, Ser. No. 229,063
4 Claims. (Cl. 136—4)

This invention relates to apparatus for the determination of various levels and of temperatures of fluids, particularly liquids.

It is desirable in many fluid installations such as liquid tanks or the like to determine the levels of the fluid or the temperature difference between two strata. Heretofore, it has been difficult to make these determinations with precision and the necessary sensitivity.

It is an object of my invention to provide an improved apparatus for determining by electrical means the level of fluids and/or the temperature difference at two remote points of a fluid.

A further object is to provide such an apparatus that is relatively simple in construction and operation, but which is highly accurate and sensitive combined with an extreme degree of miniaturization.

Other objects and advantages will be more apparent to those skilled in the art from the following description of the accompanying drawings in which:

FIG. 1 is a cross-sectional view of a liquid tank with my improved probe inserted therein, the probe being greatly enlarged compared to an actual probe;

FIG. 2 is a tremendously magnified elevational view of my improved probe, with the base thereof being broken away and cross-sectioned to expose its connections with probe tubing;

FIG. 3 is a plan view of FIG. 2; and

FIG. 4 is a tremendously magnified side view of a modified arrangement of my improved probe having the multiple sensing filaments disposed side-by-side, and with the probe tubing being cross-sectioned at its lower end and the base being broken away and cross-sectioned to expose its connection with the probe tubing.

In the particular embodiments of the invention disclosed herein, I have provided a member 1 having two axially extending passages 2 and 3 throughout the length of member 1. Disposed within one of the passages is a pair of thermocouple wires 4 and 5 terminating in a sensing junction 6. A similar pair of thermocouple wires 7 and 8 are disposed in the other passage terminating in a sensing junction 9. The junctions 6 and 9 are at different elevations so that the electrical output of these two junctions will determine either the height of the liquid level within, say a tank, or the temperatures at these two levels. The member 1 is suitably supported and terminates in base 10 so that the thermocouple wires may extend out for connection to suitable leads, which are connected in usual and well-known circuits including a reference junction and voltage measuring device for each thermocouple sensor. The two passages 2 and 3 may be disposed side-by-side as shown in FIG. 3 or one behind the other as shown at 2' and 3', FIG. 4. It will be understood that the probe may be of any desired length and the plurality of sensing junctions may be spaced depending upon the desired point of location of measurements. While only two junctions have been shown, for purposes of illustration, it is obvious that tube 1 may contain more than two passages for thermocouple sensors.

To fully understand the extreme importance of my invention, it must be understood that the member 1 is preferably made of quartz material the size of an average human hair with two passages 2 and 3 extending therethrough and with the thermocouple wires disposed within such passages. Thus, it is seen that the probe, as shown in FIG. 1 is many times larger than the actual device.

The small size of the member 1 permits it to be bent very closely back upon itself. The member 1 of a typical probe has a diameter of 0.003" and contains two holes approximately 0.0012" in diameter so that sensor wires of 0.001" diameter or less may be employed. The two holes are spaced apart to provide a suitable insulated wall between them. For use in electrically conductive fluids the sensor tubing 1 must be made from fired ceramic material such that its density is substantially 1.00 and consequently it is completely impervious to fluids.

As a result of my foregoing construction, my probe has the advantages of being completely sealed to the environment in which it measures temperatures, and in addition, the electrical insulation value of typical ceramic tubings such as silica is well-known. Furthermore, the position of the junction 6 and 9 may be carefully adjusted lengthwise within their respective passages to measure temperature at two precisely known points. This adjustment may be made easily during manufacture. It can be seen that the resulting probe is of such minute size that the disturbance of the fluid temperature pattern will be negligible and that because the sensor insulating wall is so thin response to temperature changes will be extremely rapid. Furthermore, the arrangement is novel in that the sensor wires are contained in a slack condition rather than being restrained by compacted or swaged ceramic insulation.

A typical application for the improved probe would be the maintainance of liquid level in stored rockets. The junctions 6 and 9 could then be used as sensors for a control system which could easily maintain the rocket fuel level at a point as precisely as desired by sliding one or both sets of thermocouple wires in their passages and thereby moving the two junctions 6 and 9 closer and closer together.

From the foregoing disclosure it is seen that I have provided an improved thermocouple probe for determining different temperature levels whereby the probe is extremely accurate, and sensitive, as well as being relatively rugged for a device of this kind. My improved construction is also relatively inexpensive for apparatus of this general type particularly considering its miniaturization. Previous prior art probes have necessitated the plastic deformation of the thermocouple sensor retainer tube in order to supply a probe of practical configuration. It will be noted that the very material from which tube 1 of my invention is constructed will not permit plastic deformation and it is the extreme small size of the device which permits a reasonable or useful configuration because a tube 0.003" in diameter can be deflected to a very small radius without rupture.

It will, of course, be understood that various changes in details of construction and arrangement of parts may be made by those skilled in the art without departing from the spirit of the invention, as set forth in the appended claims.

I claim:

1. A miniaturized thermocouple probe having a plurality of sensing junctions, comprising an elongated electrically-insulating ceramic tube having a cross-section to length ratio permitting said tube to be reversely bent into a relatively small unbroken loop without plastic deformation, said tube having a plurality of spaced passages each extending throughout the length of the tube, a base member supporting the ends of said tube in a fixed relationship with the portion of said tube intermediate said ends extending therefrom and reversely bent into a relatively small unbroken loop without plastic deformation, and a pair of elongated thermocouple wires each having a thermocouple sensing junction intermediate its ends and each dsposed loosely in a different one of said passages, each thermocouple wire having its sensing junction disposed at a different point along the length of the bent tube and at a different distance from said base.

2. The combination set forth in claim 1 further characterized in that the tube is made of quartz and has a diameter of approximately 0.003" that each of the passages therethrough in which the thermocouple wires are disposed has a diameter of approximately 0.0012", and that each of said thermocouple wires is of lesser cross-section than that of said passages.

3. The combination set forth in claim 1 further characterized in that the passages are disposed in side-by-side relation in substantially the same plane.

4. The combination set forth in claim 1 further characterized in that the passages are disposed one behind the other in different planes.

References Cited by the Examiner
UNITED STATES PATENTS

| 1,837,853 | 12/31 | De Florez | 73—359 |
| 2,701,270 | 2/55 | Keim et al. | 136—4 |
| 2,702,476 | 2/55 | De Boisblanc | 73—295 |

OTHER REFERENCES

Stagnation Temperature Probe, by E. M. Winkler, published in Journal of Applied Physics, February 1954, vol. 25, No. 2 (pages 231–232 relied on).

Measurement of Electrode Face Temperature, by Hess et al., published in Welding Journal, November 1943, (pages 560–561 relied on).

Article published in Analytical Chemistry Journal, November 1948, vol. 20, No. 11 (page 1017 relied on).

ISAAC LISANN, *Primary Examiner.*